United States Patent
Izenson et al.

(10) Patent No.: US 7,196,453 B2
(45) Date of Patent: Mar. 27, 2007

(54) HIGH-EFFICIENCY RADIAL PIEZOELECTRIC MOTOR

(75) Inventors: Michael G. Izenson, Hanover, NH (US); Wayde H. Affleck, Enfield, NH (US); Bruce Pilvelait, Charlestown, NH (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 130 days.

(21) Appl. No.: 11/134,606

(22) Filed: May 23, 2005

(65) Prior Publication Data

US 2006/0261705 A1   Nov. 23, 2006

(51) Int. Cl.
*H02N 2/00* (2006.01)
*H01L 41/09* (2006.01)

(52) U.S. Cl. .................... 310/316.01; 310/323.01; 310/328

(58) Field of Classification Search .......... 310/316.01, 310/323.01, 323.02, 328
See application file for complete search history.

(56) References Cited

U.S. PATENT DOCUMENTS

| | | | | |
|---|---|---|---|---|
| 2,439,499 A | * | 4/1948 | Williams et al. | 310/331 |
| 4,578,607 A | * | 3/1986 | Tojo et al. | 310/328 |
| 4,714,855 A | * | 12/1987 | Fujimoto | 310/328 |
| 4,743,792 A | * | 5/1988 | Ueyama | 310/328 |
| 4,782,262 A | * | 11/1988 | Kiyo-Oka | 310/323.02 |
| 4,814,660 A | * | 3/1989 | Yamada et al. | 310/328 |
| 4,928,030 A | * | 5/1990 | Culp | 310/328 |
| 5,144,187 A | * | 9/1992 | Culp | 310/328 |
| 5,182,484 A | * | 1/1993 | Culp | 310/328 |
| 5,696,421 A | * | 12/1997 | Zumeris et al. | 310/328 |
| 5,780,956 A | * | 7/1998 | Oliver et al. | 310/323.01 |
| 7,071,595 B2 | * | 7/2006 | Schmid et al. | 310/323.17 |

FOREIGN PATENT DOCUMENTS

| | | | | |
|---|---|---|---|---|
| JP | 61-247284 | * | 11/1986 | 310/311 |
| JP | 2-290170 | * | 11/1990 | |

* cited by examiner

*Primary Examiner*—Thomas M. Dougherty
(74) *Attorney, Agent, or Firm*—Hay Kyung Chang

(57) ABSTRACT

A radial piezoelectric motor comprises a housing, a motor shaft rotatably mounted in the housing and a plurality of piezoelectric actuators inside the housing radially disposed about the axis of the motor shaft. The motor also includes circuitry for applying a voltage to the piezoelectric actuators to expand the actuators repeatedly and in succession and apparatus responsive to the repeated and successive expanding of the actuators for rotating the motor shaft.

5 Claims, 5 Drawing Sheets

HIGH-EFFICIENCY RADIAL PIEZOELECTRIC MOTOR

The invention described herein may be manufactured, used and licensed by or for the Government for governmental purposes without the payment to us of any royalties thereon.

BACKGROUND OF THE INVENTION

This invention relates, in general, to motors, and more particularly, to miniature motors. A piezoelectric actuator is an electromechanical device that changes its dimensions when a voltage is applied across its terminals. The dimensional changes are proportional to the applied voltage; therefore the changes can be manipulated with extremely high degree of precision.

SUMMARY OF THE INVENTION

It is an object of this invention to use piezoelectric actuators as a source of mechanical energy. This and other objects of the invention are achieved, in one aspect, by a radial piezoelectric motor comprising a housing, a motor shaft rotatably mounted in the housing and a plurality of piezoelectric actuators inside the housing radially disposed about the axis of the motor shaft. The motor also includes a means, such as charge pumps, for applying a voltage to the piezoelectric actuators to expand the actuators repeatedly and in succession and a means, responsive to the repeated and successive expansion of the actuators, for rotating the motor shaft.

Another aspect of the invention involves a method of imparting motion with piezoelectric actuators comprising rotatably mounting a motor shaft in a housing and radially disposing a plurality of piezoelectric actuators inside the housing about the axis of the motor shaft. The method also includes applying a voltage to the piezoelectric actuators to expand the actuators repeatedly and in succession and rotating the motor shaft.

The piezoelectric motor uses piezoelectric actuators to drive a motor shaft and produce high-speed rotational motion in a direct drive system with no frictional couplings. It can be miniaturized, is highly efficient, produces significant amounts of output power and develops a constant torque that is independent of motor speed.

A key application of the motor is in miniature vacuum pumps needed for portable mass spectrometers that are used for detection of chemical and biological weapons, scientific instruments for spacecraft, pollution monitoring in the air and on the ground and in medical diagnostics. The motor can also be used as an actuator for actively-controlled optics on space-borne astronomical instruments. The small package size makes the motor very attractive for such devices.

Additional advantages and features will become apparent as the subject invention becomes better understood by reference to the following detailed description in conjunction with the accompanying drawings.

DESCRIPTION OF THE PREFERRED EMBODIMENT

The subject invention may be better understood by first discussing the operation of a typical piezoelectric actuator. A piezoelectric actuator is an electromechanical device that expands or contracts in direct correlation to the voltage applied across its terminals. Since the piezoelectric actuator has a capacitive electrical input impedance, a voltage may be applied across its terminals by pumping charge into or out of the actuator. The relationship between applied voltage and charge stored for an ideal capacitor is: $V=Q/C$, where V is the applied voltage, Q is the stored charge and C is the capacitance.

Figure 1:
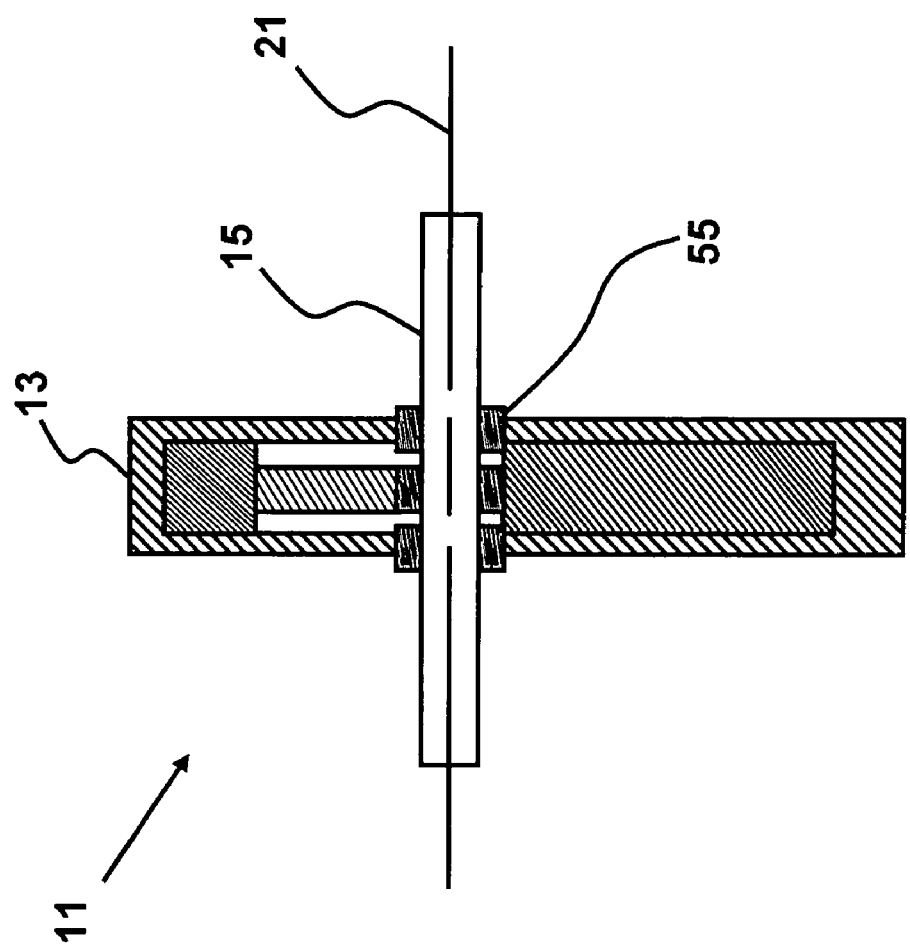
FIG. 1 is a sectional side view of a radial piezoelectric motor embodying the invention.
Figure 2:
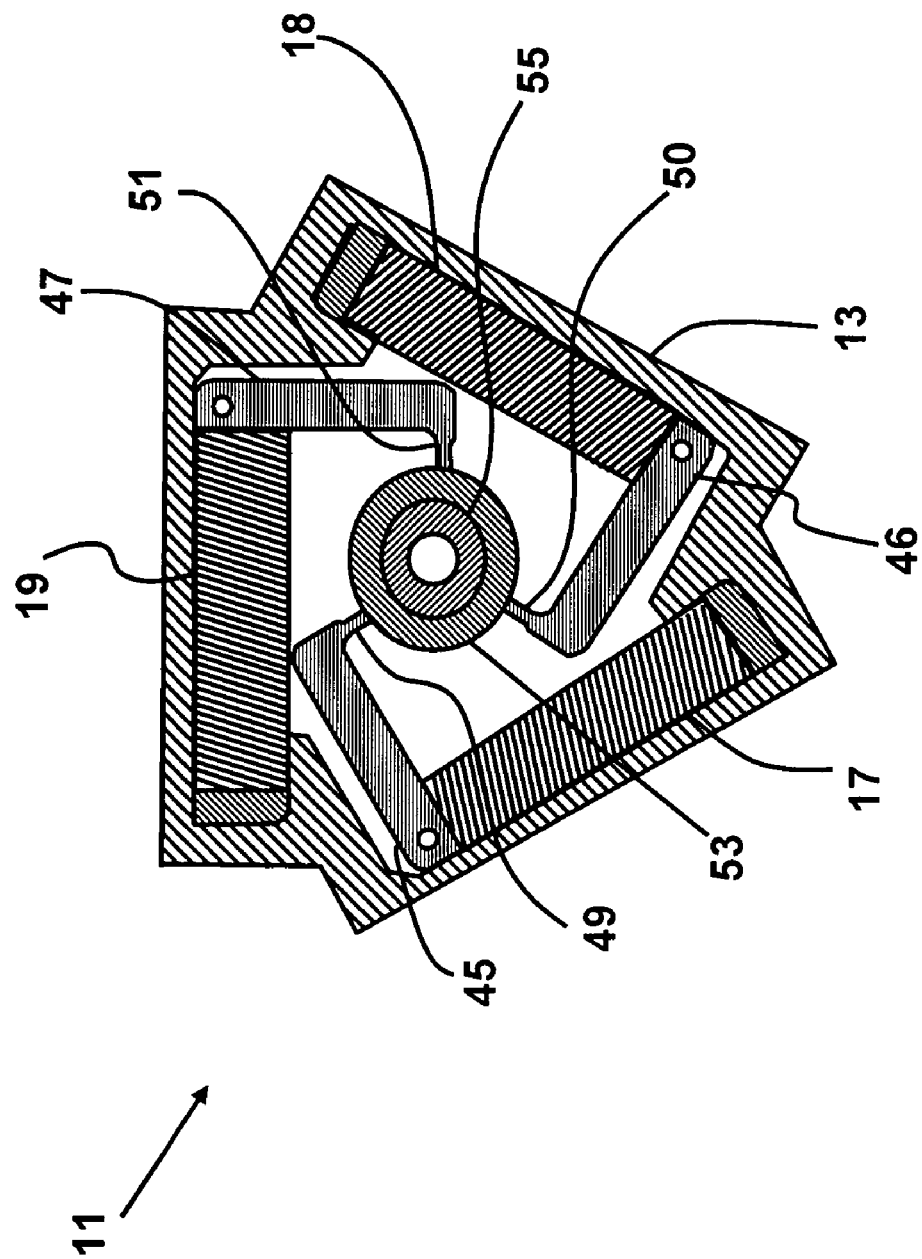
FIG. 2 is a sectional front view of the motor.

Referring now to the drawing wherein like reference numbers represent like parts and arrowheads indicate travel direction of the current in each of the several figures, FIGS. 1 and 2 show different views of radial piezoelectric motor 11 embodying the present invention. Motor 11 comprises housing 13, motor shaft 15 that is rotatably mounted in the housing and a plurality (three are shown for illustrative purposes only) of piezoelectric actuators 17, 18 and 19 that are inside the housing and radially disposed about axis 21 of the motor shaft. Exemplar actuators are Physik Instrumente low voltage (120 V) co-fired piezoelectric ceramic stack actuators. In addition, the motor includes a means for applying a voltage to the piezoelectric actuators to expand the actuators repeatedly and in succession and a means, responsive to the repeated and successive expansion of the actuators, for rotating the motor shaft.

While a variety of voltage-applying means may be employed, conveniently it may take the form of three identical charge pumps, each charge pump being connected to a respective one of the actuators 17, 18 and 19 for pumping charge into (during what is hereinafter referred to as the "energy source mode") or out of (during what is hereinafter referred to as the "energy recovery mode") the piezoelectric actuator at a rate controlled by pulse-width-modulation (PWM) of the current, chosen to achieve a desired displacement of the actuator versus time. Since the motor recovers the charge used to produce the actuator voltage, this invention has the advantage of minimizing net power consumption.

Figure 3:
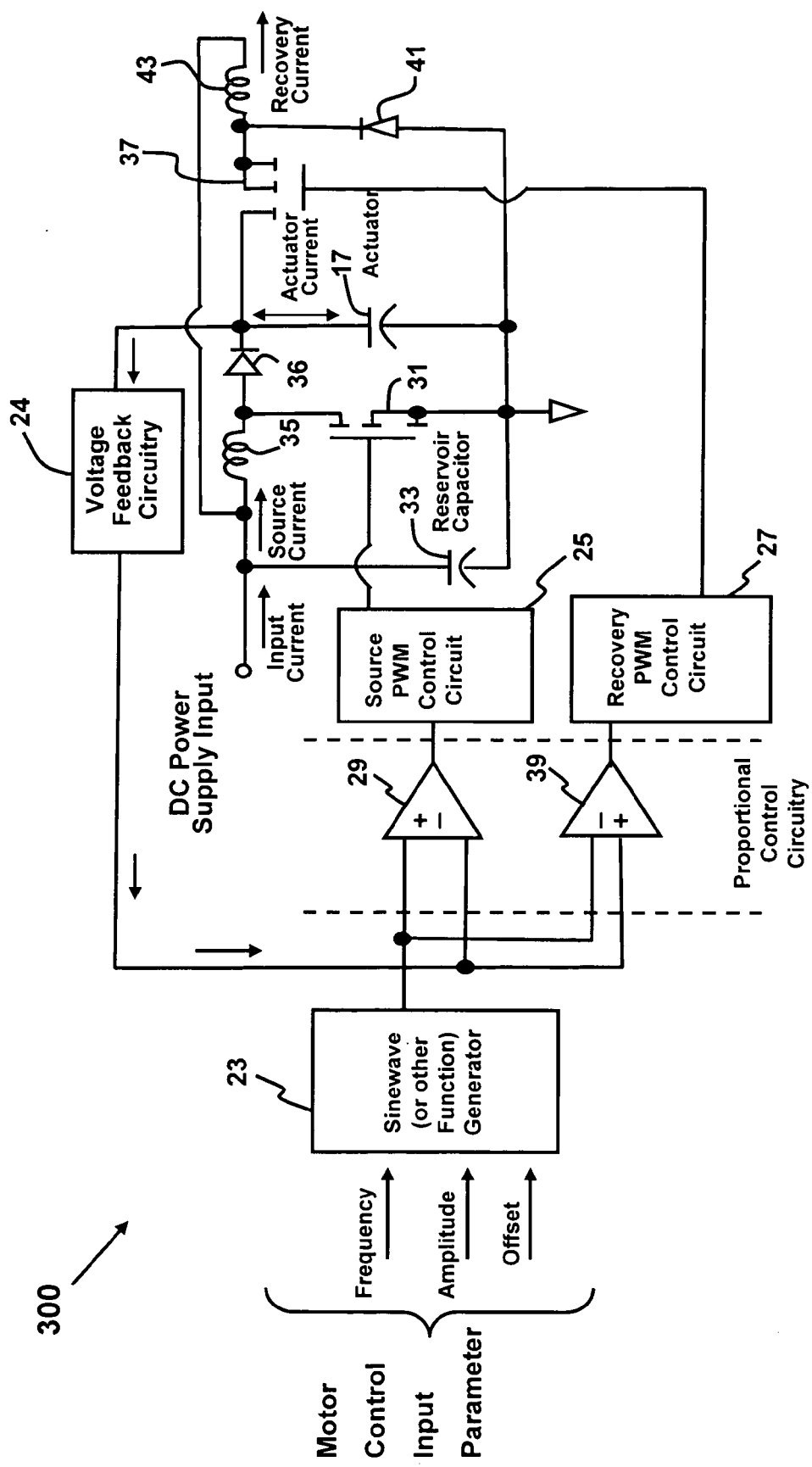
FIG. 3 shows, in block form, one of the charge pumps.

FIG. 3 shows, in block form, a charge pump (identical to the other two) 300 for pumping charge into or out of piezoelectric actuator 17, for example. Reference waveform generator 23 establishes a wave shape which coordinates this charge transfer based on frequency, amplitude and relative offset motor control input parameters. These parameters may be adjusted manually to achieve the desired operation or coordinated by higher level control loops that are responsible for maintaining system performance characteristics. The charge pump shown in FIG. 3 uses a sinusoidal waveform as the reference, although other types such as square waves or arbitrary shapes may also be used.

The output voltage of piezoelectric actuator 17 is monitored and fed back via voltage feedback circuitry 24 both to an energy source pulse-width-modulation (PWM) control circuit 25 and to an energy recovery PWM control circuit 27. For the energy source PWM control circuit 25, the reference voltage is compared to the feedback voltage by a voltage comparator 29. The voltage comparator 29 and the energy source PWM control circuit 25 modulate the operation of MOSFET 31 to pump charge from reservoir capacitor 33 into the piezoelectric actuator 17. This is done in a manner which results in the proper wave shape at the piezoelectric actuator 17 output. The charge pumping occurs via inductor 35 and diode 36 at a rate which causes the piezoelectric actuator 17 voltage to follow the reference waveform as it increases in voltage from the minimum to the maximum values.

Figure 4:
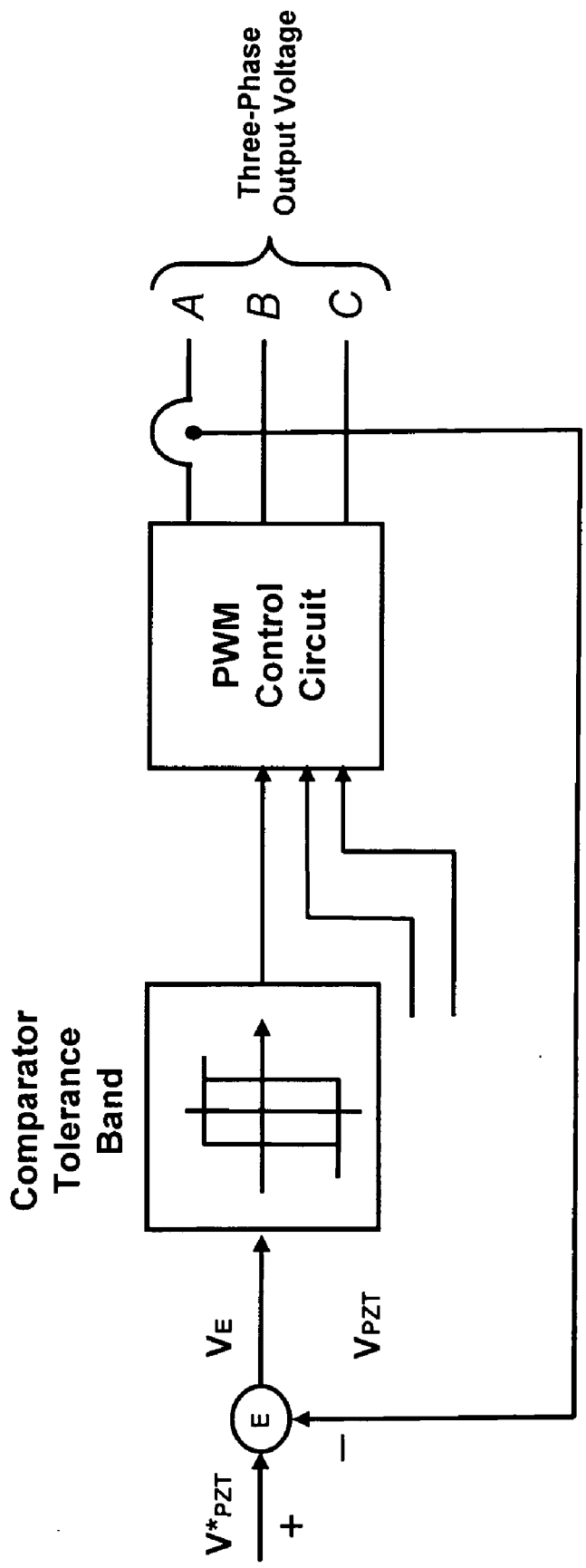
FIG. 4 shows the details of the over-all control scheme.
Figure 5:
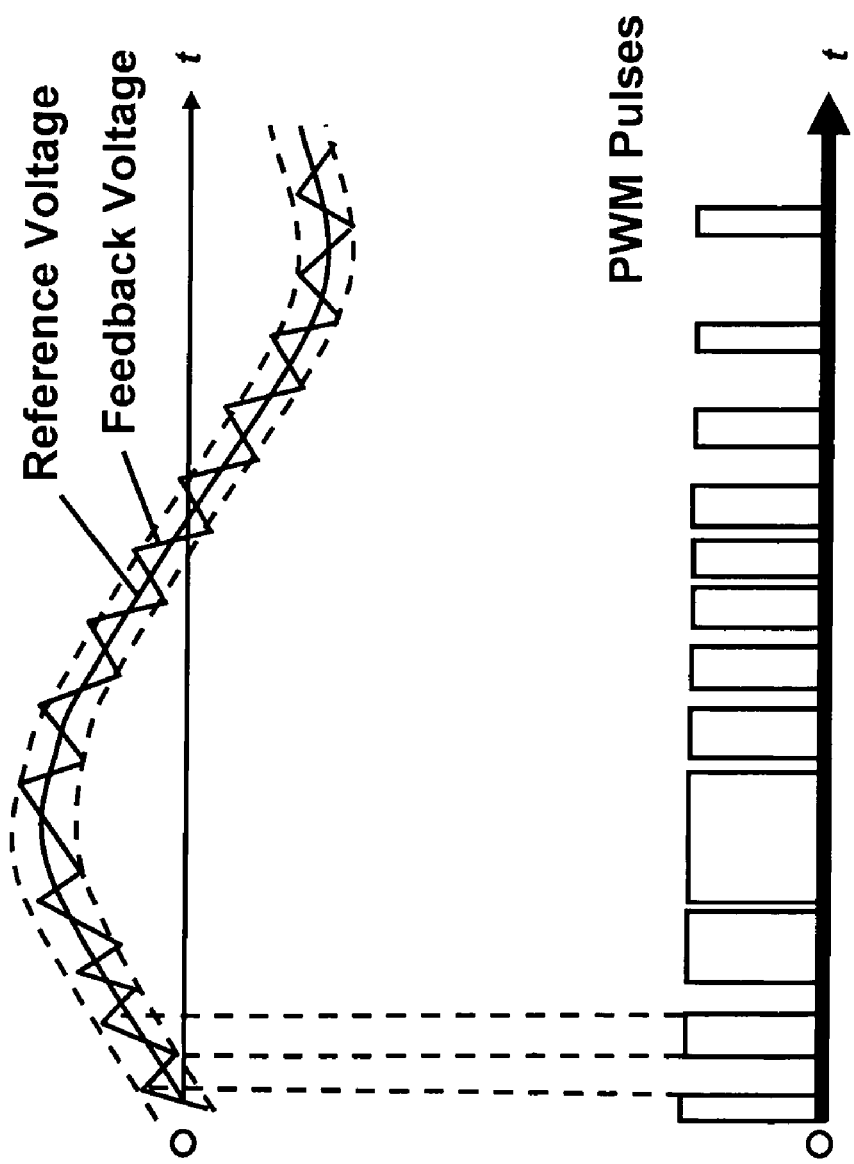
FIG. 5 illustrates pulse-width-modulation for voltage mode control of a piezoelectric actuator.

Details of the overall control scheme are shown in FIG. 4. The PWM Control Circuit shown in FIG. 4 is an overall circuit that comprises one source PWM control circuit and one recovery PWM control circuit for each actuator in the motor. The piezoelectric actuator reference voltage, $V^*_{PZT}$, is compared to the feedback voltage, $V_{PZT}$. The error voltage, $V_E$, is then processed by the tolerance band comparator and commands are issued to the PWM control circuit to mimic the reference voltage at the piezoelectric actuator output. The PWM pulses and resulting output waveform are shown in FIG. 5. The PWM control circuit achieves a variable output voltage by modulating the relative on-and-off times of the MOSFET switches. When a MOSFET is off for long periods of time, the average output voltage is relatively low. However, as the MOSFET stays on longer, the output voltage increases. FIG. 5 illustrates the correspondence between the higher average voltages occurring near the peak of the sinusoidal feedback voltage and the increased time at these instances.

Referring back to FIG. 3: during the energy source mode, the energy recovery mode comparator 39, the energy recovery PWM control circuit 27 and the MOSFET 37 are idle. Then, as the reference voltage increases further and eventually passes through the peak value of the sinusoidal waveform, the energy source mode comparator 29, the energy source PWM control circuit 25 and MOSFET 31 become idle while the energy recovery mode comparator 39, the energy recovery PWM control circuit 27 and the MOSFET 37 begin to transfer energy from the piezoelectric actuator 17 back to the reservoir capacitor 33. The energy recovery PWM control circuit 27 then modulates the MOSFET 37 to control current and charge flow from the piezoelectric actuator 17 through inductor 43, diode 41 and back to the reservoir capacitor 33.

Referring back to FIGS. 1 and 2: while the rotating means may take a variety of forms, conveniently it may take the form shown of a plurality of drive levers 45, 46 and 47, each drive lever pivoted in the housing 13 next to a respective actuator 17, 18 and 19; a plurality of flexure couplings 49, 50 and 51, preferably made from titanium, each flexure coupling connected to a respective drive lever; a circular bearing 53 that is slightly offset about the motor shaft 15 and connected to the plurality of flexure couplings; and a circular crank 55 on which the offset bearing is mounted and which, in turn, is connected to motor shaft 15. The offset is very small and hence difficult to see on the scale of the drawing.

In operation of the motor, the voltage applying means applies a voltage to the piezoelectric actuators 17, 18 and 19 to expand them repeatedly and in succession. The drive levers 45, 46 and 47 respond to the expansion of the actuators 17, 18 and 19, respectively, by pivoting away from them. The flexure couplings 49, 50 and 51 then respond to the pivoting of the drive levers away from the actuators by transmitting pulling forces. The offset bearing 53 responds to the pulling forces by transmitting to the crank 55 a torque about axis 21 of the motor shaft. Finally, the crank responds to the torque by turning the motor shaft 15.

Because the actuators 17, 18 and 19 push close to the pivots, the drive levers 45, 46 and 47 amplify the actuator motion by a factor much greater than 1.

The rotational speed of the motor is determined simply by the frequency at which the actuators are energized. The torque is equal to the force transmitted through the flexure coupling multiplied by the crank offset. If an actuator can produce a force of 220 N (50 $lb_f$) which is reduced by a factor of 10 due to the motion amplification of the drive lever and the crank offset is 50 μm (0.002 in), then the torque is approximately 0.001 N-m (0.14 oz-in) per actuator. Thus if the motor were to operate at a frequency of 1660 Hz (100,000 rpm), then the net output power would be approximately 3×0.001 N-m×1660/s=4.8 W.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A radial piezoelectric motor for producing mechanical energy efficiently, said piezoelectric motor comprising: a housing; a motor shaft rotatably mounted in said housing; a plurality of piezoelectric actuators positioned inside said housing, said actuators being radially disposed about the axis of said shaft; charge pumps equal in number to the number of said actuators, each of said pumps being coupled to a respective actuator to apply voltage to said actuator and cause said actuator to expand repeatedly and in succession, each said pump comprising a capacitor, a means for supplying current from said capacitor to said respective actuator when the voltage of said actuator is less than a pre-determined reference voltage, so as to make the voltage of said respective actuator closely follow said reference voltage; a plurality of drive levers, each of said driver levers being pivotally mounted in said housing adjacent to a respective actuator and responsive to the expansion of said respective actuator to pivot away from said respective actuator; a bearing, said bearing being slightly offset about said motor shaft; a plurality of flexure couplings, each of said flexure couplings being connected to said bearing and a respective drive lever and responding to said pivoting of said respective drive lever to transmit a pulling force to said bearing, said bearing responding to said pulling forces and, in turn, transmitting a torque about the axis of said motor shaft; and a crank on which said offset bearing is mounted, said crank being connected to said motor shaft and responding to said torque to turn said motor shaft.

2. A radial piezoelectric motor as set forth in claim 1, wherein each said charge pump further comprises: a means for feeding the current that was used to charge said respective actuator back to said capacitor when the voltage of said respective actuator is more than said reference voltage, so as to make the voltage of said respective actuator closely follow said reference voltage.

3. A method of imparting motion with piezoelectric actuators, said method comprising the steps of:

Rotatably mounting a motor shaft in a housing;

Radially disposing a plurality of piezoelectric actuators inside the housing about the axis of the motor shaft;

Supplying current to an actuator from a capacitor when the actuator voltage is less than a reference voltage, to make the voltage of the actuator closely follow the reference voltage while expanding the actuators repeatedly and in succession;

Pivoting a plurality of drive levers away from the actuators;

Delivering a pulling force to a bearing that is positioned slightly offset about the motor shaft; and Transmitting a torque about the axis of the motor shaft to rotate the shaft.

4. A method of imparting motion as set forth in claim 3, wherein said current supplying step further comprises: feeding the current that was used to charge the actuator back into the capacitor when the actuator voltage is more than a reference voltage, to make the voltage of the actuator closely follow the reference voltage.

5. A method of imparting motion as set forth in claim 3, wherein said current supply step still further comprises: pulse-modulating the current flow to control the rate at which the actuator charges.

* * * * *